US008606484B2

United States Patent
Ohata

(10) Patent No.: US 8,606,484 B2
(45) Date of Patent: Dec. 10, 2013

(54) APPARATUS FOR MEASURING IN-CYLINDER PRESSURE

(75) Inventor: Eiichiro Ohata, Kasama (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 274 days.

(21) Appl. No.: 13/126,419

(22) PCT Filed: Oct. 29, 2009

(86) PCT No.: PCT/JP2009/068562
§ 371 (c)(1),
(2), (4) Date: May 26, 2011

(87) PCT Pub. No.: WO2010/050544
PCT Pub. Date: May 6, 2010

(65) Prior Publication Data
US 2011/0224885 A1    Sep. 15, 2011

(30) Foreign Application Priority Data

Oct. 30, 2008 (JP) ................. 2008-279047

(51) Int. Cl.
G01L 23/24 (2006.01)
G01L 13/00 (2006.01)
(52) U.S. Cl.
USPC .......................................... 701/102; 123/435
(58) Field of Classification Search
USPC .......... 701/101, 102, 114; 123/435, 494, 295; 73/35.12, 114.16, 114.17
See application file for complete search history.

(56) References Cited

U.S. PATENT DOCUMENTS

| 5,713,339 | A  | * | 2/1998 | Kishida et al. | 123/676 |
| 6,029,627 | A  | * | 2/2000 | VanDyne | 123/435 |
| 6,243,641 | B1 | * | 6/2001 | Andrews et al. | 701/102 |
| 6,782,737 | B2 | * | 8/2004 | Wright | 73/114.16 |

FOREIGN PATENT DOCUMENTS

JP         4-314951 A      11/1992
JP       2007-255207 A    10/2007

OTHER PUBLICATIONS

International Search Report dated Nov. 24, 2009 including English translation (Two (2) pages).
PCT/ISA/237 Form (Three (3) pages).

* cited by examiner

Primary Examiner — Mahmoud Gimie
(74) Attorney, Agent, or Firm — Crowell & Moring LLP

(57) ABSTRACT

A method for correcting an output characteristic of an in-cylinder pressure sensor has a problem of insufficient correction precision because the measurement range required for the detection of a peak in-cylinder pressure and an ignition timing resides in a high-pressure region of an in-cylinder combustion cycle, whereas a reference pressure used for correction is measured while leaving an intake valve and an exhaust valve open, so that the reference pressure is out of the required measurement range. An apparatus for measuring an in-cylinder pressure includes: exhaust pressure detection means disposed in an exhaust port of an internal combustion engine to measure an exhaust pressure in the exhaust port; exhaust pressure recording means that records time history of the measured exhaust pressure; and peak exhaust pressure detection means that detects a peak value for each pulsation cycle of the exhaust pressure on the basis of the recorded time history of the exhaust pressure. A peak value of the in-cylinder pressure for each combustion cycle is calculated using the detected peak value of the exhaust pressure, and the calculated peak value of the in-cylinder pressure is used as a reference pressure.

1 Claim, 7 Drawing Sheets

PRESENT INVENTION

US 8,606,484 B2

APPARATUS FOR MEASURING IN-CYLINDER PRESSURE

TECHNICAL FIELD

The present invention relates to measurement of an in-cylinder pressure of an internal combustion engine, and particularly relates to a technique for suitably correcting an output characteristic of an in-cylinder pressure sensor.

BACKGROUND ART

In internal combustion engines, combustion can be effectively controlled by measuring an in-cylinder pressure and by detecting a peak in-cylinder pressure and an ignition timing, on the basis of the measured pressure, within one combustion cycle consisting of intake, compression, expansion and exhaust so as to feedback-control an air-fuel ratio and a fuel-injection timing of each cylinder. In order to further improve this effect of optimizing the air-fuel ratio and the fuel-injection timing by feedback controlling of each cylinder, their in-cylinder pressures have to be measured with higher precision. To this end, JP Patent Application Publication No. 4-314951 A (1992), for example, discloses a correction technique using, as a reference pressure, an intake pressure and an exhaust pressure detected by a piezo-electric device type pressure sensor detecting an in-cylinder pressure.

Patent Document 1: JP Patent Application Publication No. 4-314951 A (1992)

DISCLOSURE OF THE INVENTION

Problem to be Solved by the Invention

The above-mentioned conventional technique as a method for correcting an output characteristic of an in-cylinder pressure sensor has a problem of insufficient correction precision because the measurement range required for the detection of a peak combustion pressure and an ignition timing within one combustion cycle resides in a high-pressure region of the in-cylinder combustion cycle, whereas the reference pressure used for correction is measured while leaving an intake valve and an exhaust valve open, so that the reference pressure and the required measurement range differ greatly.

It is an object of the present invention to provide an in-cylinder pressure measurement apparatus capable of obtaining sufficient correction precision.

Means for Solving the Problem

In order to fulfill the above-stated object, an in-cylinder pressure measurement apparatus of the present invention includes: exhaust pressure detection means disposed in an exhaust port of an internal combustion engine to measure an exhaust pressure in the exhaust port; exhaust pressure recording means that records time history of the measured exhaust pressure; peak exhaust pressure detection means that detects a peak value for each pulsation cycle of the exhaust pressure generated in accordance with a combustion cycle on the basis of the recorded time history of the exhaust pressure; and operation means that calculates a peak value of an in-cylinder pressure for each combustion cycle using the detected peak value of the exhaust pressure, wherein the calculated peak value of the in-cylinder pressure is used as a reference pressure.

Effects of the Invention

According to the present invention, correction can be performed in a required measurement range of the in-cylinder pressure, so that the in-cylinder pressure can be measured by an in-cylinder pressure sensor with enhanced precision. Further, such enhanced measurement precision of the in-cylinder pressure leads to enhanced detection precision of a combustion pressure and an ignition time for each cylinder, and therefore the air-fuel ratio and the fuel-injection timing of each cylinder that are regulated by feedback-controlling of the engine can be brought closer to a goal state. Thereby, effects of improving performance of an internal combustion engine, including fuel consumption, nitrogen oxides, soot and noise can be expected.

BEST MODE FOR CARRYING OUT THE INVENTION

The following describes best mode for carrying out the invention, with reference to the drawings. Note here that the present invention can be carried out in various different embodiments, and therefore the following embodiments are not to be considered as restrictive.

Embodiment 1

Figure 1:
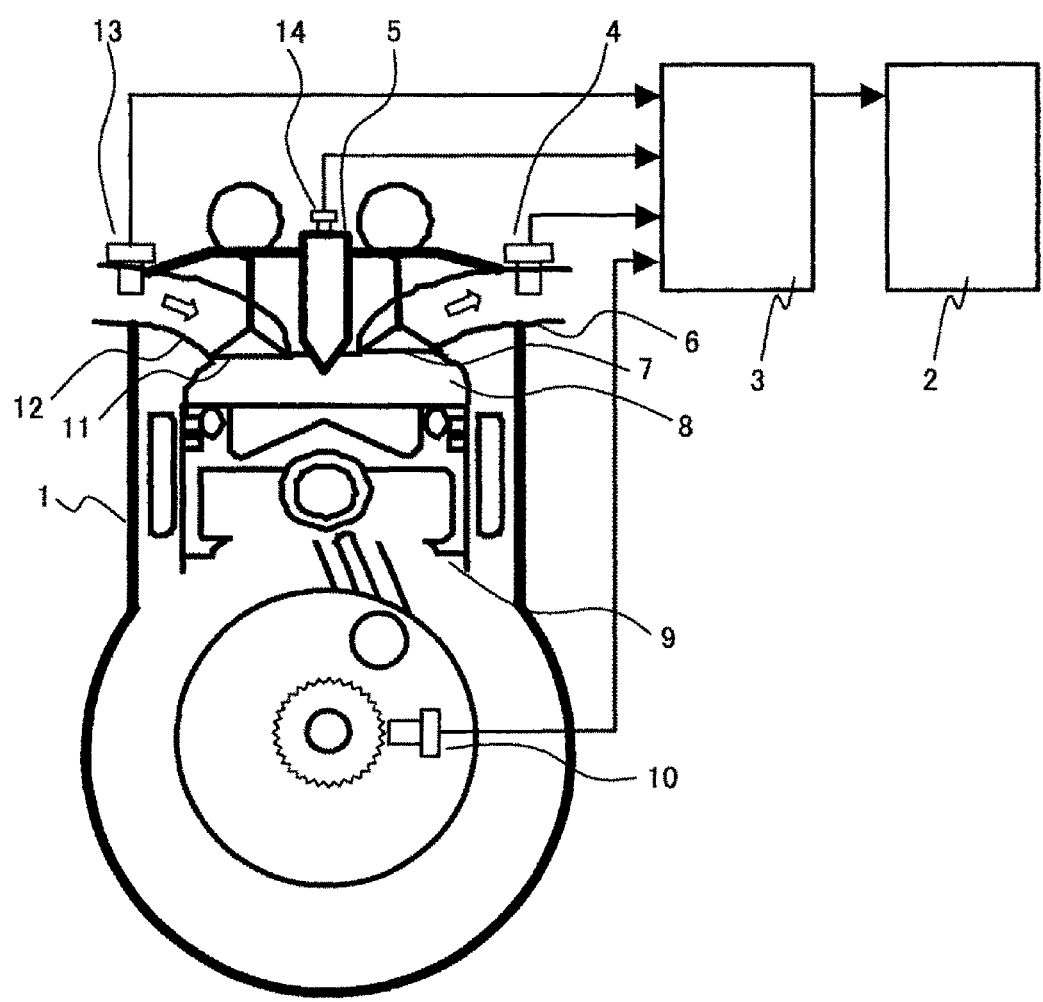
FIG. 1 describes the positioning and the connection configuration of devices required for measurement of the present invention.

FIG. 1 shows the configuration of an engine according to Embodiment 1 of the present invention. The engine is denoted by reference numeral 1 in FIG. 1.

In a combustion chamber 8, intake air and fuel are introduced via an intake valve 11 and an injector 5, respectively, to make air-fuel mixture. The air-fuel mixture undergoes compression by a piston 9 and then explodes, and burned gas changed from the air-fuel mixture by the explosion is discharged from an exhaust valve 7.

In order to detect a state of this engine, an intake pipe 12 is provided with an intake pressure sensor 13, an exhaust pipe 6 is provided with an exhaust pressure sensor 4, the injector 5 is provided with an in-cylinder pressure sensor 14, and a crankshaft is provided with a crank angle sensor 10. Signals output from these sensors are transmitted to an input/output and operational device 3, and output signals as a result of the operation by the input/output and operational device 3 are transmitted to an engine control unit (hereinafter called an ECU) 2, so that the ECU 2 decides the combustion mode of the engine 1 and controlled variables of other control mechanisms depending on the engine operation conditions.

Figure 2:
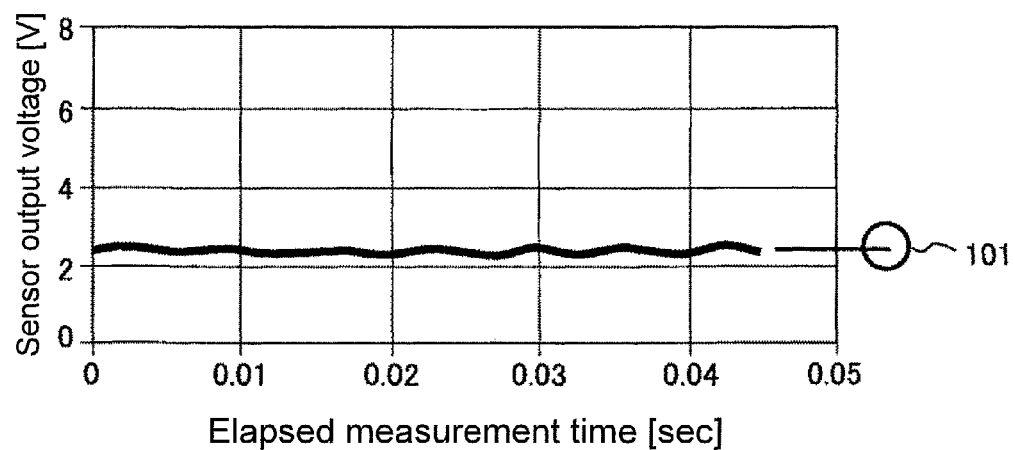
FIG. 2 shows an example of the measurement method in the measurement apparatus of the present invention.
Figure 2:
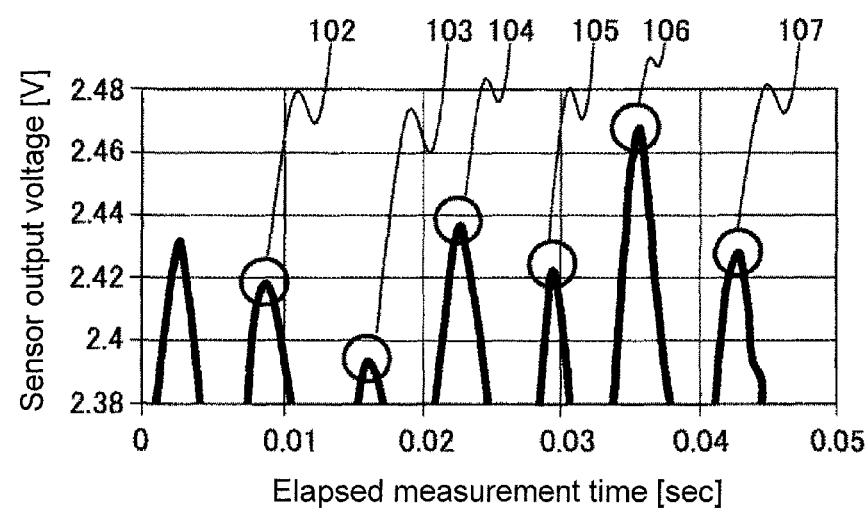

FIG. 2 shows an example of the measurement method in a measurement apparatus according to the present invention.

The input/output and operational device 3 of FIG. 1 records time history of a voltage signal output from the exhaust pressure sensor 4 of FIG. 1, and detects a time average 101 of the exhaust pressure and a peak exhaust pressure 102 to 107 for each pulsation cycle of the exhaust pressure.

The input/output and operational device 3 of FIG. 1 substitutes the detected time average 101 of the exhaust pressure and such a peak exhaust pressure generated for each pulsation cycle of the exhaust pressure into Expression 9 described later, thus calculating a peak in-cylinder pressure.

The following exemplifies the calculation of an in-cylinder pressure in the measurement method of the present invention.

The pulsation amplitude of the exhaust pressure generated through the exhaust valve attenuates before it reaches the exhaust pressure sensor 4. In other words, the peak exhaust pressure for each pulsation cycle of the exhaust pressure at the exit of the exhaust valve 7 and the peak exhaust pressure for the pulsation cycle of the exhaust pressure at the exhaust pressure sensor 4 have a relationship for pressure attenuation as a function of a ratio between their flow paths in cross-sectional area. Letting that pressure waves in the exhaust pipe 6 are plane progressive waves and attenuation of the exhaust due to viscosity can be ignored, energy of the pulsation amplitude can be considered uniform in the exhaust pipe 6, and therefore the following expression holds for the exhaust pressure pulsation amplitude on the both sides with consideration given to attenuation:

[Expression 1]

$$\frac{p_1^2 A_1}{\rho_1 c_1} = \frac{p_2^2 A_2}{\rho_2 c_2} \quad \text{Expression 1}$$

$p_1$: pressure amplitude at exhaust pressure sensor [Pa]
$p_2$: pressure amplitude at exit of exhaust valve [Pa]
$A_1$: flow path cross-sectional area at exhaust pressure sensor [m$^2$]
$A_2$: flow path cross-sectional area at exit of exhaust valve [m$^2$]
$\rho_1$: time-average exhaust density at exhaust pressure sensor [kg/m$^3$]
$\rho_2$: time-average exhaust density at exit of exhaust valve [kg/m$^3$]
$c_1$: time-average exhaust sound speed at exhaust pressure sensor [m/sec]
$c_2$: time-average exhaust sound speed at exit of exhaust valve [m/sec]
$p_{AVG}$: time-average exhaust pressure in exhaust pipe [Pa]

On the basis of Expression 1, the peak exhaust pressure for each pulsation cycle of the exhaust pressure at the exit of the exhaust valve 7 can be represented as follows:

[Expression 2]

$$p_{2MAX} = p_{AVG} + \frac{p_2}{2} \quad \text{Expression 2}$$
$$= p_{AVG} + \sqrt{\frac{A_1 \rho_2 c_2}{A_2 \rho_1 c_1}} \cdot (p_{1MAX} - p_{AVG})$$

$p_{1MAX}$: peak exhaust pressure for each pulsation cycle of exhaust pressure at exhaust pressure sensor [Pa]
$p_{2MAX}$: peak exhaust pressure for each pulsation cycle of exhaust pressure at exit of exhaust valve [Pa]

In Expression 2, letting that the time-average temperature and the time-average pressure in the exhaust pipe 6 are uniform, the peak exhaust pressure for each pulsation cycle of the exhaust pressure at the exit of the exhaust valve 7 can be calculated by the following expression:

[Expression 3]

$$p_{2MAX} = p_{1MAX} \sqrt{\frac{A_2}{A_1}} + p_{AVG}\left(1 - \sqrt{\frac{A_2}{A_1}}\right) \quad \text{Expression 3}$$

Next, letting that the exhaust valve is considered as an orifice and the gas flow rate in the combustion chamber immediately before opening of the exhaust valve is zero, the following expression holds on the basis of the Bernoulli theorem for a relationship between the in-cylinder pressure immediately before opening of the exhaust valve 7 and the peak exhaust pressure for each pulsation cycle of the exhaust pressure at the exit of the exhaust valve 7:

[Expression 4]

$$p_3 = \rho_3 \left( \frac{V_{2MAX}^2}{2} + \frac{p_{2MAX}}{\rho_{2MAX}} \right) \quad \text{Expression 4}$$

$p_3$: in-cylinder pressure immediately before opening of exhaust valve [Pa]
$\rho_3$: in-cylinder gas density immediately before opening of exhaust valve [kg/m$^3$]
$p_{2MAX}$: peak pressure value at exit of exhaust valve [Pa]
$\rho_{2MAX}$: exhaust density at exit of exhaust valve [kg/m$^3$]
$V_{2MAX}$: exhaust flow rate at exit of exhaust valve [m/sec]

The substitution of Expression 3 into Expression 4 allows the in-cylinder pressure immediately before opening of the exhaust valve 7 to be calculated by the following expression:

[Expression 5]

$$p_3 = \rho_3 \left( \frac{V_{2MAX}^2}{2} + \frac{p_{1MAX}\sqrt{\frac{A_2}{A_1}} + p_{AVG}\left(1 - \sqrt{\frac{A_2}{A_1}}\right)}{\rho_{2MAX}} \right) \quad \text{Expression 5}$$

Letting herein that terms other than $p_{1MAX}$ and $p_{AVG}$ are constant terms, the following expression will be derived:

[Expression 6]

$$p_3 = O \times p_{1MAX} + P \times p_{AVG} + Q \quad \text{Expression 6}$$

O: constant 1, P: constant 2, Q: constant 3

Optimum values are calculated for constants 1, 2 and 3 by a test conducted beforehand, whereby influences of errors by other factors and calculation processing load can be reduced.

Next, letting that adiabatic expansion occurs in the combustion chamber, the following expression holds on the basis of Poisson's relation for a relationship between the peak in-cylinder pressure and the in-cylinder pressure immediately before opening of the exhaust valve 7:

[Expression 7]

$$p_4 = p_3 \frac{v_3^{K_3}}{v_4^{K_4}} \quad \text{Expression 7}$$

$p_4$: peak in-cylinder pressure [Pa]
$K_3$: in-cylinder gas specific-heat ratio immediately before opening of exhaust valve [−]

$K_4$: in-cylinder gas specific-heat ratio when in-cylinder pressure reaches peak [−]
$v_3$: in-cylinder volume immediately before opening of exhaust valve [m³]
$v_4$: in-cylinder volume when in-cylinder pressure reaches peak [m³]

The substitution of Expression 5 into Expression 7 leads to the following expression:

[Expression 8]

$$p_4 = \frac{v_3^{K_3}}{v_4^{K_4}}\left[\frac{\rho_3}{\rho_{2MAX}}\left\{p_{1MAX}\sqrt{\frac{A_2}{A_1}} + p_{AVG}\left(1 - \sqrt{\frac{A_2}{A_1}}\right)\right\}\right] + \frac{\rho_3}{2}v_{2MAX}^2$$

Expression 8

Letting herein that terms other than $p_{1MAX}$ and $p_{AVG}$ are constant terms, the following expression will be derived:

[Expression 9]

$$p_4 = R \times p_{1MAX} + S \times p_{AVG} + T$$

Expression 9

R: constant 4, S: constant 5, T: constant 6

Optimum values are calculated for constants 4, 5 and 6 by a test conducted beforehand, whereby influences of errors by other factors and calculation processing load can be reduced.

Figure 3:
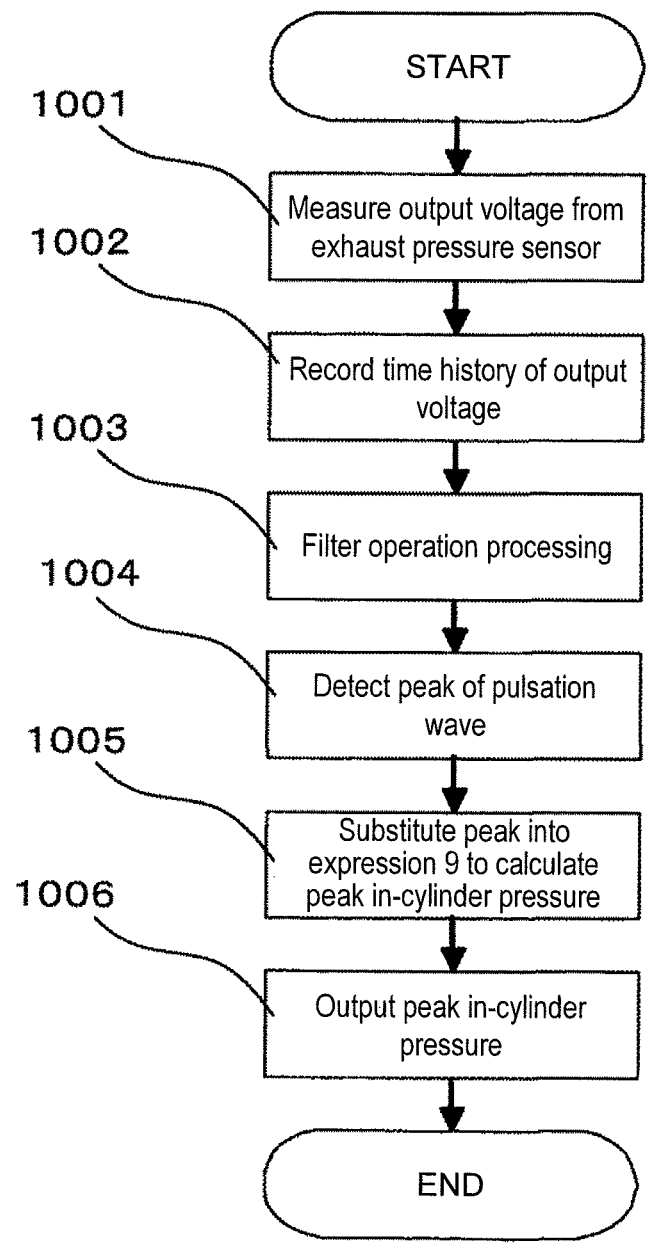
FIG. 3 is a flowchart showing one implementation method of the measurement in the present invention.

FIG. 3 is a flowchart showing one implementation method of the measurement according to the present invention.

The measurement method of the present invention includes measurement, operation and output that are cyclically repeated.

Firstly, a voltage signal output from the exhaust pressure sensor 4 attached to the exhaust pipe 6 is measured (block 1001).

Next, time history of the voltage signal measured at block 1001 is recorded (block 1002).

Next, filter operation processing is carried out to the voltage signal recorded at block 1002, thus removing unnecessary noise components therefrom (block 1003).

Next, a peak value for each pulsation cycle of the voltage signal, from which the noise components have been removed at block 1003, is detected (block 1004).

Next, the peak value detected at block 1004 is substituted into Expression 9, thus calculating a peak value of the in-cylinder pressure for each combustion cycle (block 1005).

Next, the peak value of the in-cylinder pressure for each combustion cycle calculated at block 1005 is output (block 1006).

The above procedure allows a peak in-cylinder pressure for each combustion cycle to be obtained.

Figure 4:
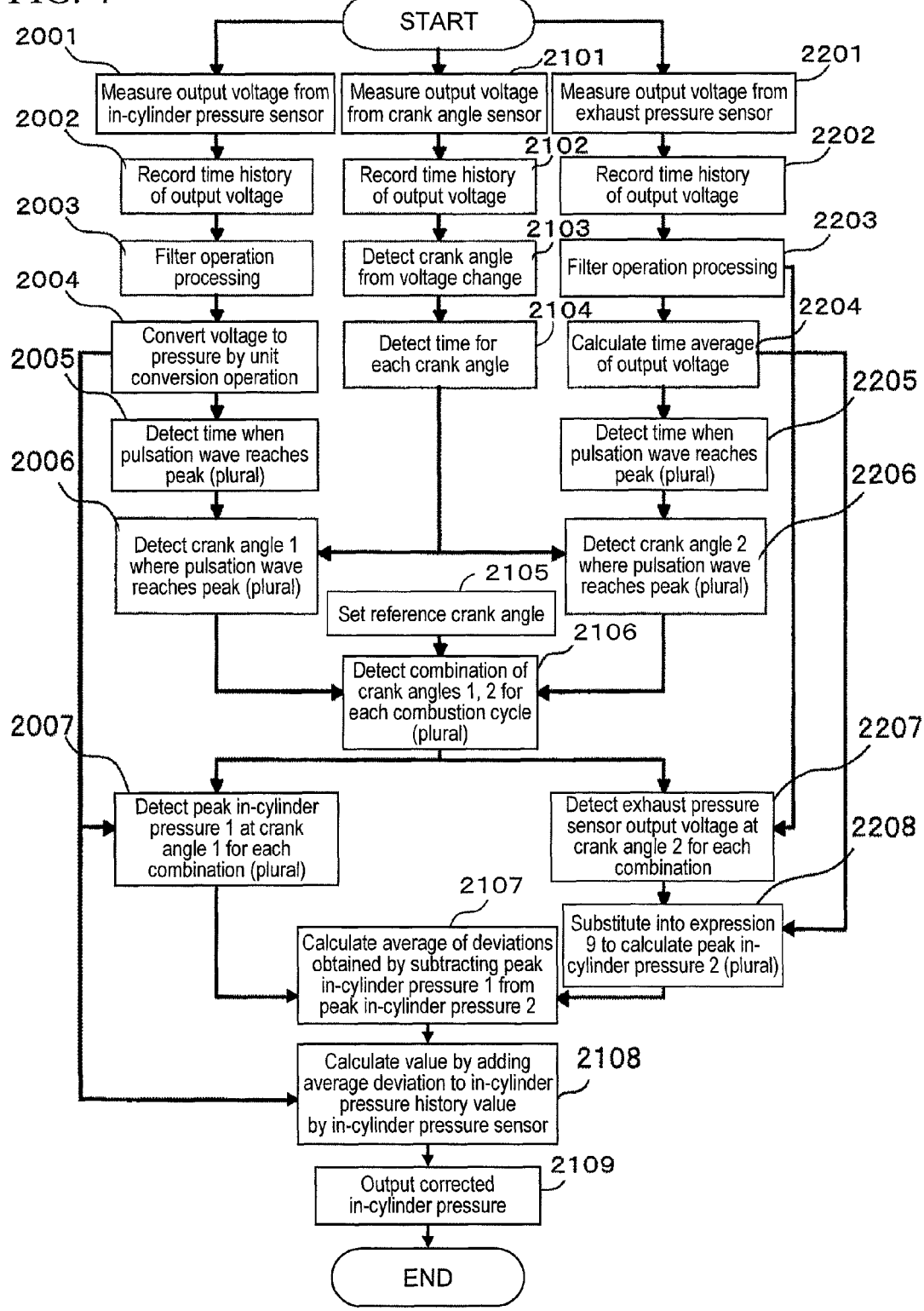
FIG. 4 is a flowchart showing another implementation method of the measurement in the present invention.

FIG. 4 is a flowchart showing another implementation method of the measurement according to the present invention.

The measurement method of the present invention includes measurement, operation and output that are cyclically repeated.

Preferably, one measurement period includes a plurality of combustion cycles, whereby influences of errors due to variations in combustion from combustion cycle to combustion cycle can be reduced.

In the case of an internal combustion engine with a plurality of cylinders, one measurement period may be the period obtained by multiplying the number of the cylinders by the combustion cycle, whereby errors due to in-cylinder pressure deviation among the cylinders can be reduced.

Firstly, an output voltage from the crank angle sensor 10 is measured (block 2101).

Next, time history of the output voltage measured at block 2101 is recorded (block 2102).

Next, a crank angle is detected on the basis of a change in the output voltage recorded at block 2102 (block 2103).

Next, on the basis of the crank angle detected at block 2103, a time corresponding to each crank angle is detected (block 2104).

Next, a voltage signal output from the in-cylinder pressure sensor 14 is measured (block 2001).

Next, time history of the voltage signal measured at block 2001 is recorded in the input/output and operational device (block 2002).

Next, filter operation processing is carried out to the voltage signal recorded at block 2002, thus removing unnecessary noise components therefrom (block 2003).

Next, the unit of the voltage signal, from which the noise components have been removed at block 2003, is converted from voltage to pressure (block 2004).

Next, in the pulsation waves of the pressure subjected to the unit conversion at block 2004, a time when the pressure reaches its peak is detected (block 2005).

Next, comparison is made between the time detected at block 2005 when the pressure reaches its peak and a time detected at block 2104 for each crank angle, so as to detect the crank angle where both of the times become the closest to each other as a crank angle 1 (block 2006).

Next, a voltage signal output from the exhaust pressure sensor 4 is measured (block 2201).

Next, time history of the voltage signal measured at block 2201 is recorded in the input/output and operational device (block 2202).

Next, filter operation processing is carried out to the voltage signal recorded at block 2202, thus removing unnecessary noise components therefrom (block 2203).

Next, a time average of the voltage signal, from which the noise components have been removed at block 2203, is calculated (block 2204).

Next, in the pulsation waves of the voltage signal, from which the noise components have been removed at block 2203, a time when the pressure reaches its peak is detected (block 2205).

Next, comparison is made between the time detected at block 2205 when the pressure reaches its peak and a time detected at block 2104 for each crank angle, so as to detect the crank angle where both of the times become the closest to each other as a crank angle 2 (block 2206).

Next, a reference crank angle is set so that a deviation between the crank angle 1 where the in-cylinder pressure reaches its peak and the crank angle 2 where the exhaust pressure reaches its peak in the pulsation of the exhaust pressure generated by the corresponding combustion cycle becomes substantially constant (block 2106).

Next, in order to find a combination of the crank angle 1 and the crank angle 2 for each combustion cycle, the sum of the reference crank angle detected at block 2105 and the crank angle 1 detected at block 2006 is compared with the crank angle 2 detected at block 2206, so as to detect a combination of the crank angle 1 and the crank angle 2 having a minimum difference therebetween (block 2106).

Next, a peak in-cylinder pressure 1 at the crank angle 1 in the combination detected at block 2106 is detected (block 2007).

Next, an output voltage from the exhaust pressure sensor 4 at the crank angle 2 in the combination detected at block 2106 is detected (block 2207).

Next, the output voltage from the exhaust pressure sensor 4 detected at block 2207 and the time average of the output voltage calculated at block 2204 are substituted into Expression 9, thus calculating a peak in-cylinder pressure 2 at the crank angle 2 (block 2208).

Next, a value obtained by subtracting the peak in-cylinder pressure 1 detected at block 2007 from the peak in-cylinder pressure 2 calculated at block 2208 is calculated the number of times corresponding to the number of combustion cycles included in the one measurement period, thus calculating an average of the values for the combustion cycles (block 2107).

Next, a value as a corrected in-cylinder pressure is calculated by adding the average calculated at block 2107 to the in-cylinder pressure converted at block 2004 (block 2108).

Next, the corrected in-cylinder pressure calculated at block 2108 is output (block 2109).

The above procedure enables an in-cylinder pressure corrected in an output characteristic of the in-cylinder pressure sensor 14 to be obtained.

Figure 5:
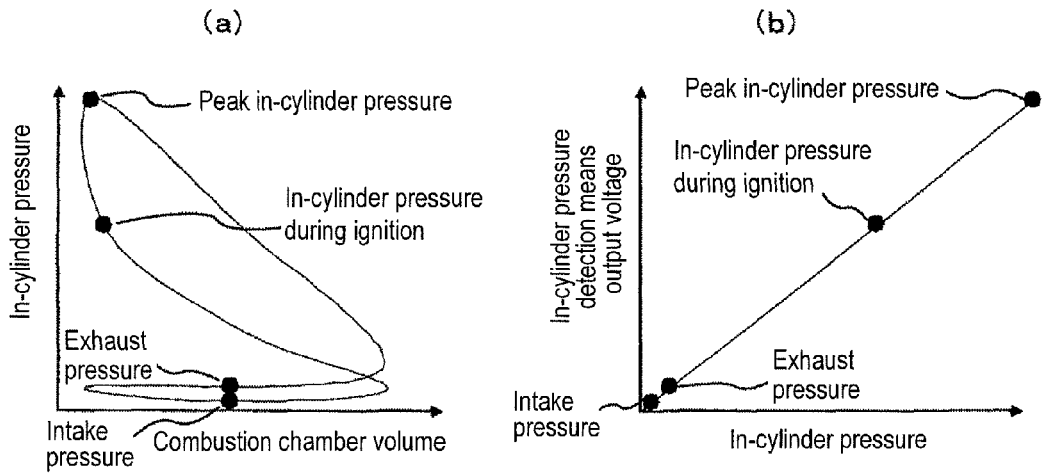
FIG. 5 schematically shows correction means that corrects an output characteristic of in-cylinder pressure detection means in the measurement method of the present invention.
Figure 5:
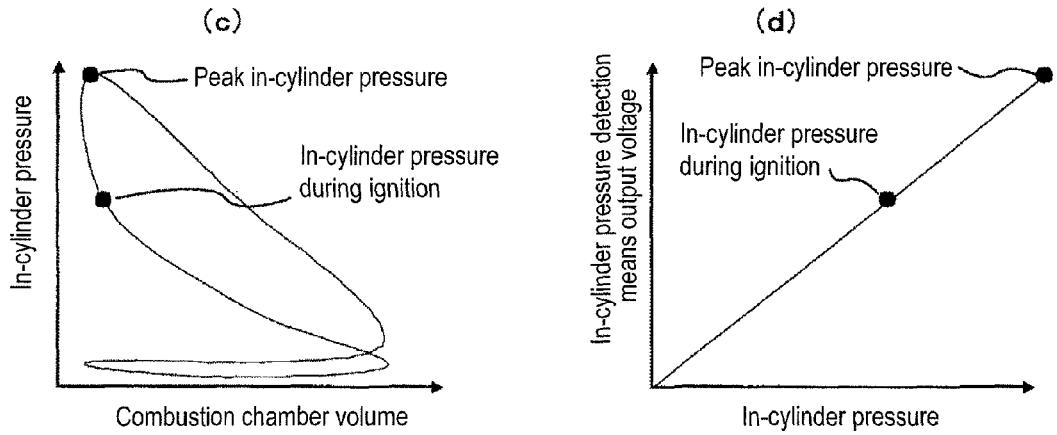

FIG. 5 schematically shows correction means that corrects an output characteristic of in-cylinder pressure detection means in the measurement method of the present invention.

FIG. 5(a) on the upper left side shows a relationship between an in-cylinder pressure of an internal combustion engine and the volume of the combustion chamber 8, showing an intake pressure and an exhaust pressure used for conventional correction means as well as an in-cylinder pressure at the time of ignition and a peak in-cylinder pressure as measurement targets.

FIG. 5(b) on the upper right side shows an output characteristic of the in-cylinder pressure detection means showing a relationship between an in-cylinder pressure and an output voltage from the in-cylinder pressure detection means. FIG. 5(b) shows an intake pressure and an exhaust pressure used for conventional correction means as well as an in-cylinder pressure at the time of ignition and a peak in-cylinder pressure as measurement targets.

In FIG. 5(a) and (b) on the upper side relating to the conventional technique, the intake pressure and the exhaust pressure used for correction means deviate from the in-cylinder pressure at the time of ignition and the peak in-cylinder pressure as measurement targets, and therefore higher pressures are required for the correction means so as to improve the correction precision of the output characteristic in the in-cylinder pressure detection means.

In this respect, in FIG. 5(c) and (d) on the lower side as the present invention, a peak in-cylinder pressure is used for the correction means, thus enabling enhanced correction precision of the output characteristic in the in-cylinder pressure detection means.

Figure 6:
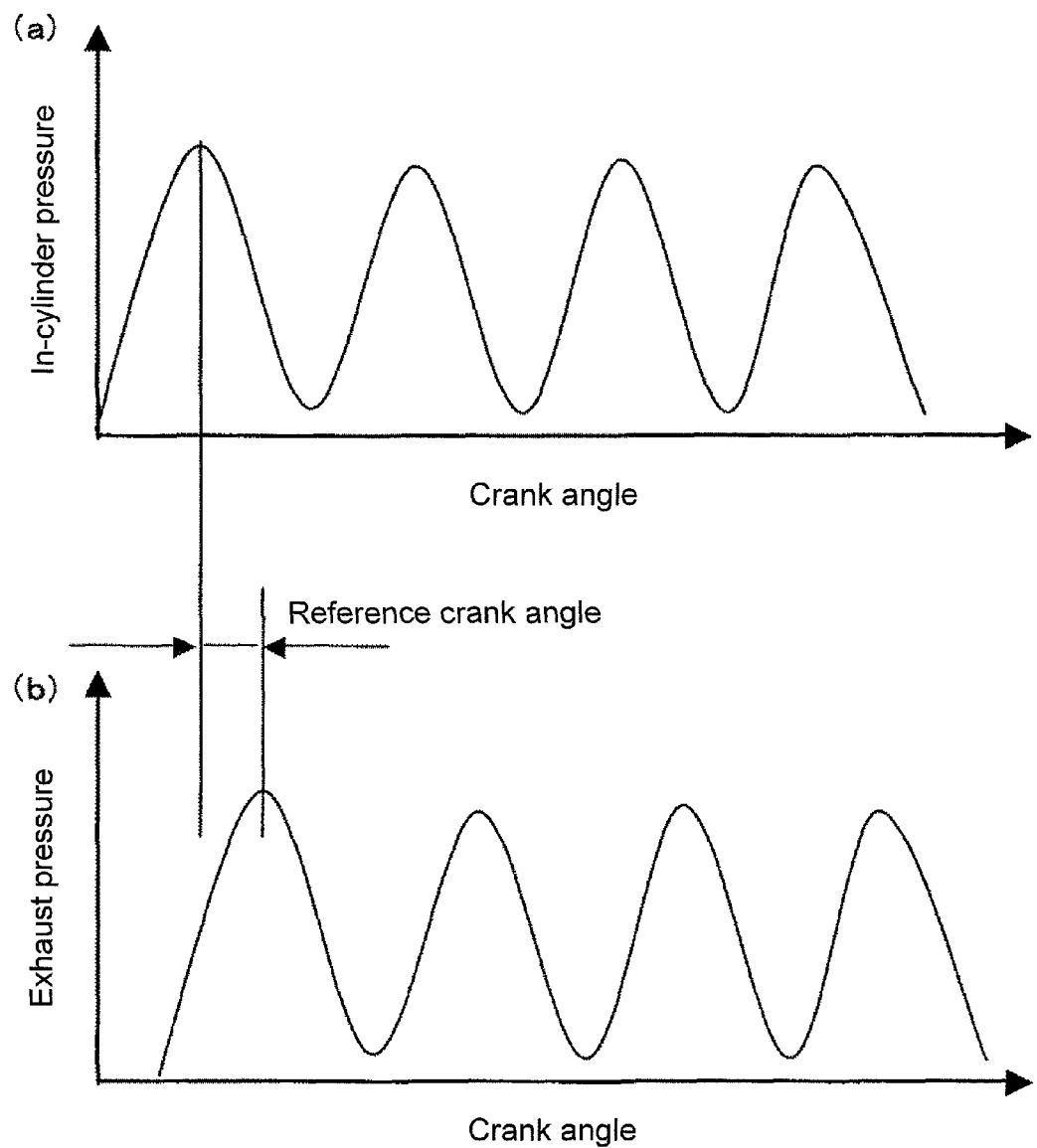
FIG. 6 schematically shows a reference crank angle at block 2105 of FIG. 4.

FIG. 6 schematically shows the reference crank angle at block 2105 of FIG. 4. FIG. 6(a) on the upper side exemplifies a crank angle and an in-cylinder pressure in an internal combustion engine. FIG. 6(b) on the lower side exemplifies a crank angle and an exhaust pressure in an internal combustion engine.

As shown in FIG. 6, waveforms of the in-cylinder pressure and the exhaust pressure are out of phase with each other in crank angle. Such a phase shift results from the time required for the in-cylinder pressure to be transmitted to the exhaust pipe 6 in a combustion cycle, and the time includes the time required for expansion procedure in the combustion chamber 8 and the pressure propagation time from the exhaust valve to the exhaust pressure sensor. The time required for expansion procedure in the combustion chamber is decided mainly by a crank angle at which the exhaust valve 7 is opened. The pressure propagation time from the exhaust valve 7 to the exhaust pressure sensor 4 is decided by the distance from the exhaust valve 7 to the exhaust pressure sensor 4 and the sound speed of the exhaust. Herein, since the pressure propagation time from the exhaust valve 7 to the exhaust pressure sensor 4 is sufficiently smaller than the time required for expansion procedure in the combustion chamber 8, the former can be ignored for decision of the in-cylinder pressure pulsation of the exhaust pulsation source.

Accordingly, the reference crank angle is defined as a crank angle between the top dead center and the exhaust valve open, whereby a required precision can be obtained for the identification of the combination at block 2106 of Embodiment 2.

Figure 7:
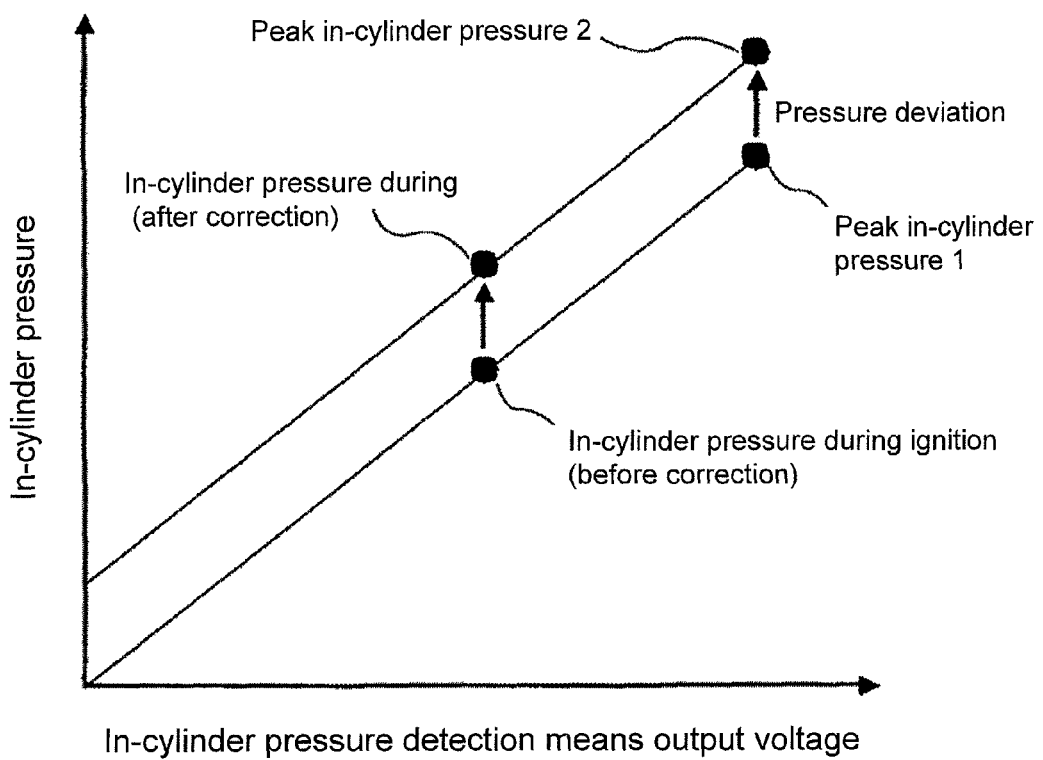
FIG. 7 shows an example of the method for correcting an output characteristic of an in-cylinder pressure sensor.

FIG. 7 shows an example of the method for correcting the output characteristic of the in-cylinder pressure sensor 14 at block 2108 of FIG. 4. The horizontal axis represents an output voltage from the in-cylinder pressure sensor 14, and the vertical axis represents an in-cylinder pressure. When the output characteristic of the in-cylinder pressure sensor 14 generates a drift due to a change in the ambient temperature of the in-cylinder pressure sensor 14, such a drift can be corrected using the present invention. A pressure deviation between the peak in-cylinder pressure 2 and the peak in-cylinder pressure 1 is found, and letting that this deviation is an error due to a change in the characteristic of the in-cylinder pressure sensor 14, a corrected in-cylinder pressure can be calculated by adding the pressure deviation to the in-cylinder pressure before correction that is detected as an in-cylinder at the time of ignition. Thusly, an error due to a change in characteristics of the in-cylinder pressure sensor 14 can be corrected.

INDUSTRIAL APPLICABILITY

The present invention is applicable not only to internal combustion engines but also to equipment cyclically discharging high-pressure gas such as a reciprocating motion machine and a rotary machine like a compressor.

DESCRIPTION OF REFERENCE NUMBERS

1 Engine
2 ECU
3 Input/output and operational device
4 Exhaust pressure sensor
5 Injector
6 Exhaust pipe
7 Exhaust valve
8 Combustion chamber
9 Piston
10 Crank angle sensor
11 Intake valve
12 Intake pipe
13 Intake pressure sensor
14 In-cylinder pressure sensor

The invention claimed is:
1. An in-cylinder pressure measurement apparatus that measures an in-cylinder pressure of an internal combustion engine, comprising:
crank angle detection means that detects a crank angle of the internal combustion engine;
crank angle recording means that records time history of the detected crank angle;
in-cylinder pressure detection means that detects an in-cylinder pressure;

in-cylinder pressure recording means that records time history of the detected in-cylinder pressure;

peak in-cylinder pressure 1 detection means that detects a peak value of the in-cylinder pressure for each combustion cycle on a basis of the recorded time history of the in-cylinder pressure;

time 1 detection means that detects a time when the in-cylinder pressure for each combustion cycle reaches a peak on a basis of the recorded time history of the in-cylinder pressure;

crank angle 1 detection means that detects a crank angle 1 where the in-cylinder pressure for each combustion cycle reaches a peak on a basis of the recorded time history of the crank angle;

exhaust pressure detection means disposed in an exhaust port of the internal combustion engine to detect an exhaust pressure in the exhaust port;

exhaust pressure recording means that records time history of the detected exhaust pressure;

peak exhaust pressure detection means that detects a peak value of the exhaust pressure for each pulsation cycle on a basis of the recorded time history of the exhaust pressure;

peak in-cylinder pressure 2 operation means that calculates a peak value of the in-cylinder pressure for each combustion cycle using the detected peak value of the exhaust pressure;

time 2 detection means that detects a time when the exhaust pressure for each pulsation cycle reaches a peak on a basis of the recorded time history of the exhaust pressure;

crank angle 2 detection means that detects a crank angle 2 where the exhaust pressure for each pulsation cycle reaches a peak on a basis of the recorded time history of the crank angle;

reference crank angle setting means that sets a reference crank angle so that a deviation between a crank angle 1 and a crank angle 2 where the exhaust pressure generated by the in-cylinder pressure reaching a peak at the time of the cylinder angle 1 becomes substantially constant in a plurality of combustion cycles;

crank angle combination detection means that compares a sum of the reference crank angle and a crank angle 1 with a crank angle 2 in a plurality of combustion cycles to detect a combination of a crank angle 1 and a crank angle 2 having a minimum difference therebetween;

operation means that calculates, in the detected combination of crank angles, a pressure deviation between a peak in-cylinder pressure 2 calculated from the exhaust pressure at the crank angle 2 using the peak in-cylinder pressure 2 operation means and a peak in-cylinder pressure 1 at the crank angle 1; and correction means that corrects an output characteristic of the in-cylinder pressure detection means using the calculated pressure deviation.

\* \* \* \* \*